United States Patent Office 2,943,180
Patented June 28, 1960

2,943,180
STEEL WELDING

David R. Kelker, Allison Park, Pa., assignor, by mesne assignments, to Air Reduction Company, Incorporated, New York, N.Y., a corporation of New York No Drawing. Continuation of application Ser. No. 466,223, Nov. 1, 1954. This application Aug. 29, 1958, Ser. No. 758,165

9 Claims. (Cl. 219—74)

This invention relates to the welding of steels by means of a high-speed, gas-shielded metal-arc process.

The primary object of the instant invention is to provide steel welding wires and methods which decrease or eliminate porosity in the welding of steel articles by the gas-shielded, metal-arc welding method.

A further object is the provision of steel welding wires and methods by which the speed of welding can be increased.

Another object is the provision of a welding method and wire which permits satisfactory welding when the weld pool tends to run due to the influence of gravity.

Porosity in the welding of many steels is believed to be due to the entrapment of carbon monoxide which results when carbon reduces iron oxide in the molten weld pool. However, porosity is also a problem in other steels in which there should be little or no iron oxide. This porosity may be caused by nitrogen, hydrogen, other oxygen sources, such as manganese oxide, or surface contaminants, such as rust. A further complicating factor is the preference to weld steel with small oxygen additions to the inert shielding gas. Porosity is, of course, a more serious problem in the welding of steels in which either the deposited metal or the workpiece, or both, are rimmed or semi-killed steel.

Many precautions and proposals have been made towards eliminating porosity. The steel electrode wire must be especially clean, that is, free of rust and drawing lubricants. It has been proposed to use deoxidizers, such as manganese or silicon. The Muller U.S. Patent No. 2,621,278 proposes that a very small amount of aluminum can be added to a welding wire in order to provide a deoxidizer. This patent and other prior research indicated that it was not desirable to add more than a very small amount of aluminum to a weld pool since it may cause cracking or unfavorably alter the composition of the weld metal.

It was discovered that an aluminum-coated steel wire, having a relatively large quantity of aluminum, can be added to a weld pool to eliminate porosity without adverse effects. Further, it has been determined that such a wire has particular applicability to the inert-gas-shielded, metal-arc welding of steel in which oxygen additions are made to the monatomic inert gas, such as argon and helium. Additional tests have proved that the relatively large quantity of aluminum has additional beneficial effects in the use of such a welding process, especially as to welding speed and the welding on curved or inclined surfaces. A complete explanation of the functioning of the aluminum-coated wire is not known. The elimination of porosity due to oxygen in steel forming the weld pool was expected. The absence of intolerable adverse effects, either to the weld metal, the shielding gas, or the arc, from the relatively large quantity of aluminum was unexpected. The viscous aluminum oxide film which forms can be the reason why faster welding can be done since it shields the weld pool when it is outside of the shielding gas umbrella. Furthermore, this film may simultaneously retain the weld pool slightly longer in molten condition to permit escape of gases. This film also retains the weld pool where deposited and prevents run-off. In other words, the viscous, aluminum-oxide film gives a rectangular-like weld bead and serves to hold the weld pool in position if the molten metal is on a surface which would tend to permit the force of gravity to displace the molten metal. This condition will be referred to as a "flow-away" condition. Furthermore, the aluminum does not appreciably interfere with the functioning of the oxygen addition, although aluminum is a strong deoxidizer. It may be, when oxygen additions are used, that the oxygen, after performing its intended function, contributes in a beneficial manner to the formation of the aluminum oxide film. It has been noted that, in some instances, slightly more oxygen is needed when using aluminum-coated wire.

By means of the instant invention, most steels can be welded without porosity. In accordance with the preferred form of the instant invention, a welding arc is established between a consuming wire electrode and a steel workpiece. The arc zone is blanketed by a gas shield which preferably contains a small amount of oxygen. A weld pool is formed by the arc melting the wire electrode and the workpiece. The welding wire is coated with a thin coating of substantially elemental aluminum. The aluminum coating constitutes 0.5–2.0% of the weight of the small diameter steel welding wires which are conventional with the described process. The term, substantially elemental aluminum, means a pure alminum coating which contains only a small amount of elements, such as 3% silicon.

Advantages of the instant invention were first realized when welding ASTM A–285, rimmed-steel plate having the following percentage composition:

| | |
|---|---|
| Carbon | 0.19 |
| Manganese | 0.37 |
| Silicon | 0.01 |
| Sulfur | 0.26 |
| Phosphorus | 0.006 |

The welding wire, made of steel, was identified as No. 1024 and had the following percentage composition:

| | |
|---|---|
| Carbon | 0.28 |
| Manganese | 1.29 |
| Silicon | 0.17 |
| Sulfur | 0.024 |
| Phosphorus | 0.022 |

This 1/16 inch wire was coated with aluminum about 0.0005 inch thick by an acid etch and hot-dip process. After coating, the wire would fall through an 0.062 die. Then the wire was light drawn through a die (0.057 of an inch in diameter) to smooth it.

Bead welds were made using a constant-wire-feed, welding head on a 7/8 inch thick plate using the basic features of the process which is described in the U.S. Muller et al. Patent No. 2,504,868. The shielding gas was argon, plus 1–4.8 percent oxygen. The current was DCRP (direct current, reverse polarity-work is negative). The typical currents and voltages were respectively 300 amperes and 33 volts. The weight percentage of aluminum in the wire when used was about 0.9%. The surfaces of these weld pools appeared different from bare wire weld pools since the weld pool surfaces were covered with the viscous aluminum oxide film. A heavy loose scale of aluminum oxide on the weld bead was also noted. X-rays showed porosity-free welds. The boiling of the weld pool, throwing metal 12 inches, which was noted with bare wire and oxygen additions, was not observed in using the aluminum-coated wire. All arcs were normal, that is, of the spray type, constant arc length. The arc length was about ⅜₆ of an inch. The wire speed was about 276–286 i.p.m.

The coating of the wire can be done by many hot-dip processes and drawing techniques which will give a strong bonding of aluminum to steel. Thus, an annealed wire can be cleaned and dried and then dipped in a hot bath. After wiping, the wire is cold drawn twice whereby the surface is smoothed. When the drawing compounds are removed, the wire is wound on spools.

The coated welding wire when used as the electrode must be a low-cast wire; that is, the wire must not be too springy, if the wire is to be the consuming electrode. For instance, the A-675 wire hereinafter described is tested for a suitable low-cast characteristic by determining that a section of wire (five feet in length) does not curl up but does form a single loop, the ends of the wire being spaced about 6–12 inches. The low-cast characteristic is achieved by proper drawing techniques. It is preferred that the aluminum coating contain about 3% silicon since improved current pick-up has been noted.

For the welding of carbon and low alloy steels, especially where rust or flow-away conditions may exist or higher speeds are desired, the preferred wire composition is 0.07–0.14% carbon; 0.90–1.10% manganese; 0.30–0.60% silicon; and the remainder being principally iron with nominal amounts of sulfur, phosphorus and residual elements. Normally, for clean-surface, average-speed, flat welding, this wire is quite suitable. The amount of aluminum is 0.5–2.0% of the wire. The preferred welding current is DCRP. The shielding gas is argon with 1–5% oxygen addition. With this combination of features, porosity-free welds, greater welding speeds are obtained and selding can be done under "flow-away" conditions.

The instant invention has also been used in the welding of a special stainless steel to 4130 steel. This special stainless steel contains 16% chrominum, 25% nickel and 6% molybdenum. The welding current was DCRP and oxygen additions were used in the inert gas shield.

For welded overlay work when a soft, sound deposit is desired, the preferred wire is aluminum-coated ingot-iron wire having the composition given hereinafter. In this situation, the usual rimming is definitely encountered since soft, rimmed filler or electrode wire is used. Frequently the overlay welding will be "flow-away" type welding above-mentioned, as in overlay positions. Since in overlay work less dilution is usually obtained, it is possible to use an amount of aluminum which is at the low side of the given range, that is, about 0.5% and to obtain both deoxidation and the skin effect. In conventional welding, more dilution occurs and more aluminum is necessary. The instant aluminum-coated ingot-iron wire, of course, completely eliminated porosity and resulted in a satisfactory low hardness in the overlay. The preferred feature is that the aluminum constitutes about 0.5% of the deposited metal. Thus, the aluminum-coated wire can be added to the weld pool as an auxiliary wire if the feed rates of the uncoated electrode wire and the auxiliary wire result in the foregoing quantity of aluminum.

The compositions of some of the steel wires which were used in the instant invention are as follows:

|  | C-1005 | Ingot |
|---|---|---|
| Carbon | 0.042 | 0.04 |
| Manganese | 0.155 | 0.06 |
| Sulfur | 0.024 | 0.02 |
| Phosphorus | 0.009 | 0.02 |
| Silicon | 0.07 | 0.01 |

The composition of the workpiece which was overlaid with ingot-iron is as follows:

|  | WD 1050 |
|---|---|
| Carbon | 0.50 |
| Manganese | 0.88 |
| Phosphorus | 0.02 |
| Sulfur | 0.02 |
| Silicon | 0.15 |

Other carbon and low alloy steel workpieces have been welded, as well as high alloy steels, with suitable aluminum-coated wires.

Many types of shielding gases and welding currents have been used with the instant wires but, as above-mentioned, best results are obtained with the instant wire using argon containing 1–5% oxygen and direct current reverse polarity. Another gas which is preferred is 28% argon, 70% helium and 2% oxygen, using the same current. With alternating current or direct current straight polarity wherein the wire is negative, the aluminum-coated wire should be wash-coated with rubidium carbonate or some other activating agent. Reference can be made to U.S. patent applications S.N. 288,447 and 288,448 (filed by Muller on May 17, 1952 and now Patent Nos. 2,694,763 and 2,694,764) for other activating agents which effect metal spray transfer. Another shielding gas which can be used is carbon dioxide. See, for example, Gibson et al. Patent No. 2,907,865, filed November 1, 1954. With carbon dioxide, it is to be noted that the carbon dioxide will break down and so the gas shield will contain oxygen. Under this condition which would be conducive to rimming the above-mentioned interaction between aluminum and oxygen probably occurs.

The instant wires having 0.5–2.0% aluminum as a smoothed tightly-adhered coating will have diameters between about ³⁄₆₄″ and ⅛″ after drawn and will be wound on small, smoothed-surfaced spools which are adapted for feeding wire to gas-shielded welding processes.

Welding speeds of 85 i.p.m. have been consistently obtained using the instant wire for welding mild steel. In many instances, speeds as high as 100 i.p.m. have resulted. The aluminum oxide film apparently protects the trailing part of the weld pool. The "flow-away" welding conditions, such as encountered in making a butt weld at the line which is quite near a downwardly curved surface, did not prove a problem. With instant wire, sound acceptable welds are produced where beads made with other wires would run off. Other "flow-away" conditions would be encoutered in overlaying a rotating piston or when welding tilted flat work.

All weld metal tests of welds made with aluminum-coated high silicon, high manganese wire (above-mentioned) gave tensile, yield and elongation results which closely approached the all weld metal properties of the welds made with the uncoated wire. Thus, it was shown that the relatively large amount of aluminum did not substantially affect the weld. However, excessive amounts of aluminum are to be avoided since inclusions resulting therefrom act as stress raisers which are harmful under dynamic stress.

In summary, it is to be noted that the instant method of adding a relatively large amount of aluminum to a ferrous weld pool which contains sources of gases at arc heat and temperature effectively prevents porosity without adverse effect on the welding arc or weld. Furthermore, with the instant amount of aluminum coating, it is possible to increase welding speeds or to lay a curved or inclined weld or both. With the instant amount of aluminum, it is also possible to weld rusty steel articles. A further advantage resides in the fact that the aluminum coating prevents surface oxidation during storage and, hence, practically eliminates any problem of shelf-life due to oxidation or rusting. In view of the various steels which have been welded, it is believed that the instant coating and process is useful in the welding of all steels.

It is to be understood that, when the instant aluminum-coated wire is used as an electrode wire, preferred features of the instant invention are a gas-shielded arc, electrode wire speeds and regulation of the welding current and voltage so that a metal spray transfer is effected. The wire feed speed is in excess of 100 inches per minute.

The present application is a continuation of copending application Serial No. 466,223, filed November 1, 1954, entitled "Steel Welding."

It will also be understood that this invention is not limited to the specific illustrative embodiments thereof, above-described, but includes such modifications as fall within the scope of the following claims.

I claim:

1. The method of welding a steel workpiece which comprises establishing an arc between a wire consuming steel electrode and said workpiece; shielding said arc by means of a gas to exclude air from said arc; said wire electrode being coated only with substantially pure aluminum; the aluminum coating being disposed uniformly on said electrode and constituting between 0.5% to 2.0% by weight of said electrode; and feeding said electrode toward the arc at high speed as the electrode is melted by said arc and is transferred to said workpiece.

2. The method of welding a steel workpiece comprising establishing a direct current, reverse polarity arc between a wire consuming steel electrode and said workpiece; shielding said arc by means of an inert gaseous medium containing 1% to 5% oxygen; said wire electrode being coated with substantially pure aluminum; said aluminum coating being disposed uniformly on said electrode and constituting between 0.5% to 0.9% by weight of said electrode; advancing said electrode toward the arc as the electrode is melted by said arc and is transferred to said workpiece.

3. In a method of welding a steel workpiece wherein molten metal is deposited thereon at a location from which said molten metal would normally tend to flow away, the improvement which comprises establishing a gas shielded arc to said steel workpiece at said location; feeding an aluminum coated steel electrode to said arc so that said electrode is melted and transferred onto said location to form a molten pool at said location; said electrode consisting essentially of a steel wire core and an aluminum coating constituting 0.5% to 2.0% by weight of said core whereby said molten pool becomes covered with a viscous aluminum oxide film which retards the tendency of said pool to flow away.

4. The method of welding a steel workpiece wherein molten metal is deposited thereon at a location from which said molten metal would normally tend to flow away, which comprises establishing a gas shielded arc to said steel workpiece at said location; feeding a steel wire electrode to said arc so that said electrode is melted onto said location to form a molten pool; said electrode being uniformly coated with substantially pure aluminum in an amount constituting 0.5% to 2.0% by weight of said electrode, whereby said molten pool becomes covered by a viscous film which retards the tendency of said pool to flow away; and the gaseous medium shielding said arc containing from 1% to 5% oxygen at the arc zone.

5. The method of welding steel articles which comprises establishing an arc between a steel workpiece and a wire consuming steel electrode; shielding the arc zone with an inert monatomic gaseous medium containing 1% to 5% oxygen; feeding said electrode to said arc so that said electrode is melted and transferred onto said workpiece to form a weld pool thereon; said electrode having a coating of aluminum which constitutes 0.5% to 2.0% by weight of said electrode; and said coated electrode having a smooth surface which is free of any coating exteriorly of said aluminum coating.

6. The method of depositing ingot iron metal on a steel workpiece which comprises establishing an arc between said workpiece and an ingot iron wire electrode; feeding said electrode toward said arc to form a weld pool; feeding to said pool an auxiliary steel electrode coated with substantially pure aluminum, the aluminum coating being more than 0.5% but less than 2.0% by weight of said steel electrode; feeding said steel electrode at a rate sufficient to provide about 0.5% of said aluminum in the deposited metal forming said weld pool; and said coated electrode being free of any coating exteriorly of said aluminum coating.

7. A welding wire electrode adapted for use in high-speed, gas shielded, metal-arc welding processes; said electrode comprising a steel core and a substantially pure and smooth aluminum coating disposed uniformly on said core; said aluminum constituting 0.5% to 2% by weight of said electrode; and said aluminum coating constituting the surface of said electrode and being free of any coating exteriorly thereof.

8. A welding wire supply which is adapted to supply wire to a high-speed, gas shielded, metal-arc welding process using a consuming welding wire; said welding supply comprising a smooth surfaced spool and an aluminum coated, steel wire having a diameter between about 3/64 and 1/8 of an inch wound on said spool; said aluminum coating constituting 0.5% to 2% by weight of said wire; and said aluminum coating being smooth and disposed uniformly on said steel wire.

9. The method of welding a steel workpiece which comprises establishing an arc between said workpiece and a wire consuming steel electrode; shielding said arc from the air by a flow of gaseous medium selected from the group consisting of argon containing 1% to 5% oxygen and carbon dioxide; said electrode consisting essentially of a steel core and an aluminum coating which is disposed uniformly on said core and constitutes 0.5% to 2.0% by weight of said electrode; said steel electrode being adapted to be fed at high speeds from a wire spool to said arc; and advancing said electrode at a high speed as the wire is melted and transferred by said arc to said workpiece.

References Cited in the file of this patent

UNITED STATES PATENTS

| 2,010,605 | Miller | Aug. 6, 1935 |
| 2,053,417 | Brace | Sept. 8, 1936 |
| 2,319,977 | Cape et al. | May 25, 1943 |
| 2,497,119 | Fink | Feb. 14, 1950 |
| 2,504,867 | Muller | Apr. 18, 1950 |
| 2,504,868 | Muller et al. | Apr. 18, 1950 |
| 2,544,711 | Mikhalapov | Mar. 13, 1951 |
| 2,621,278 | Muller | Dec. 9, 1952 |
| 2,681,970 | Koopman | June 22, 1954 |
| 2,800,707 | Whitfield et al. | July 30, 1957 |

FOREIGN PATENTS

| 309,796 | Great Britain | Apr. 18, 1929 |
| 709,533 | Great Britain | May 26, 1954 |